Feb. 7, 1933.     P. A. VAILE     1,896,336
AIRPLANE WING CONSTRUCTION
Original Filed Aug. 30, 1930

Inventor:
Pembroke A. Vaile,
By Bertha L. MacGregor
Atty.

Patented Feb. 7, 1933

1,896,336

UNITED STATES PATENT OFFICE

PEMBROKE A. VAILE, OF CHICAGO, ILLINOIS, ASSIGNOR OF ONE-HALF TO SHELDON CLARK, OF CHICAGO, ILLINOIS

AIRPLANE WING CONSTRUCTION

Original application filed August 30, 1930, Serial No. 479,056. Divided and this application filed September 14, 1931. Serial No. 562,706.

This invention relates to improved means of obtaining an area of negative pressure or vacuum on moving bodies, such as sails, parachutes, airplane wings and the like. This is a division of my co-pending application, Serial No. 479,056, filed August 30, 1930, the present application being directed to the invention as embodied in airplane wings.

It is recognized that the major portion of the lift in the conventional airplane is obtained from the vacuum or area of negative pressure above the wing or wings of the machine. The shape of the forward portion of the wing adjacent to and above the front part or leading edge of the wing determines the line of the air-stream and consequently the location and extent of the suctional area above the wing.

It has been discovered that the suctional action of this vacuum or area of negative pressure operates in an analogous manner in the act of sailing boats and especially when sailing against the wind, beating or tacking, as it is called in nautical language, and that the power of the suction or negative pressure on the lee side of the sail is actually greater than the positive pressure on the windward side of the sail.

It is also my belief that as a parachute moves through the air the greater portion of the resistance is provided by the outer and upper portion of the fabric and not by the inner and lower portion thereof.

Following this line of reasoning I have endeavored to provide air-streams of such form as to increase the suctional effect of the area of negative pressure, the means whereby this end is achieved being described herein and shown in the accompanying drawing.

Figure 1:
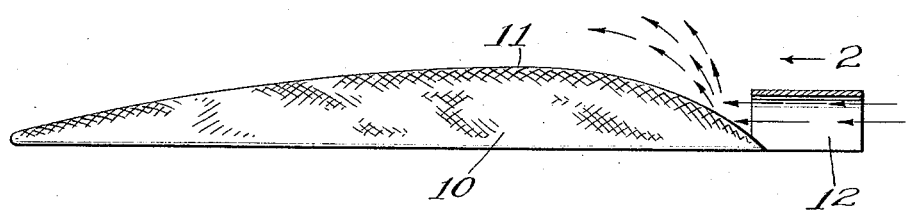
Fig. 1 is an end elevation partly in view of an airplane wing embodying my invention.
Figure 2:
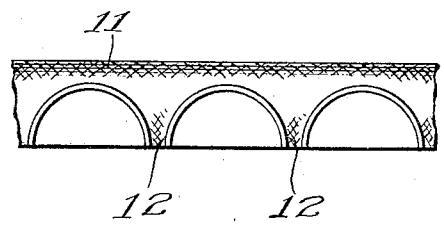
Fig. 2 is a fragmentary front view of the same.

In the flight of an airplane the air in front of the wing is influenced by the passage of the wing or wings through the air to a distance approximately equal to the chord of the wing, that is, the distance from the front or leading edge to the rear or trailing edge, and it is obvious that there must be in front of the leading edge a considerable amount of compression of the air before it is diverted upward by the curve of the wing in order to provide the most effective suctional area or areas of negative pressure on top of the wing. Although this pressure undoubtedly exists the air-stream against the leading edge caused by the passage of the plane through the atmosphere is very elastic and practically uncontrolled.

The airplane wing is indicated at 10 in the drawing. It is my purpose to confine the air-stream to more specific paths and to more definitely direct it against the deflecting surface 11 of the wing, by providing the leading edge of the plane wing 10 with a series of inverted U-shaped channels 12 a suitable distance in front of the leading edge of the plane. These may be either continuous or separated and they may, if desired, have a funnel shaped flange to further concentrate the air flow on the leading edge of the plane.

Changes may be made in details of construction without departing from the scope of my invention and I do not intend to be limited to the exact form shown and described except as set forth in the appended claims.

I claim:

1. In an airplane wing, a series of inverted U-shaped channels located forwardly of the leading edge of the wing and arranged to confine and direct air in streams to the leading edge of the wing.

2. An airplane wing provided on its leading edge with a series of horizontally disposed open ended arched bodies for directing air in confined streams to the leading edge of the wing.

In testimony that I claim the foregoing as my invention, I affix my signature this 12th day of September, 1931.

PEMBROKE A. VAILE.